(12) United States Patent  (10) Patent No.: US 10,298,425 B2
Yoshimura  (45) Date of Patent: May 21, 2019

(54) RADIO REPEATER, SOUND QUALITY ADJUSTMENT SYSTEM, AND SOUND QUALITY ADJUSTMENT METHOD

(71) Applicant: JVC KENWOOD Corporation, Yokohama-shi, Kanagawa (JP)

(72) Inventor: Motoshi Yoshimura, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 0 days.

(21) Appl. No.: 15/942,067

(22) Filed: Mar. 30, 2018

(65) Prior Publication Data
US 2018/0295002 A1   Oct. 11, 2018

(30) Foreign Application Priority Data

Apr. 7, 2017  (JP) .................. 2017-076367

(51) Int. Cl.
*H04B 7/15* (2006.01)
*H04L 27/01* (2006.01)
*H04W 8/24* (2009.01)
*H04B 7/155* (2006.01)
*H04L 5/16* (2006.01)

(52) U.S. Cl.
CPC ............. *H04L 27/01* (2013.01); *H04B 7/15* (2013.01); *H04B 7/15528* (2013.01); *H04W 8/245* (2013.01); *H04L 5/16* (2013.01)

(58) Field of Classification Search
CPC ......... H04L 65/4092; H04L 2001/0097; H04L 12/2807; H04W 8/22; H04W 84/08; H04W 84/12; H04W 88/04; H04W 8/245; G06F 3/165; G06F 17/30026; G06F 9/542; H04N 21/4126; H04N 5/928; H04R 2430/01; H04M 1/03; H04B 1/20; H04H 20/67; H04H 20/12; H04S 7/307
See application file for complete search history.

(56) References Cited

U.S. PATENT DOCUMENTS 5,295,178 A * 3/1994 Nickel ................ H03G 1/02
370/525

FOREIGN PATENT DOCUMENTS

JP   2013-135320 A   7/2013

* cited by examiner

*Primary Examiner* — Rahel Guarino
(74) *Attorney, Agent, or Firm* — Procopio, Cory, Hargreaves and Savitch LLP

(57) ABSTRACT

The present disclosure is aimed at making an adjustment operation for sound quality evaluation of a radio device easy. A radio repeater includes: a reception unit configured to receive a radio signal from a first radio terminal; a relay equalizer configured to adjust a frequency characteristic of the radio signal based on a configuration; a configuration reflection unit configured to reflect configuration information on the frequency characteristic received via a communication line in a configuration of the relay equalizer; and a transmission unit configured to transmit the radio signal that has been adjusted to a second radio terminal.

8 Claims, 16 Drawing Sheets

RADIO REPEATER, SOUND QUALITY ADJUSTMENT SYSTEM, AND SOUND QUALITY ADJUSTMENT METHOD

CROSS REFERENCE TO RELATED APPLICATION

This application is based upon and claims the benefit of priority from Japanese patent application No. 2017-076367, filed on Apr. 7, 2017, the disclosure of which is incorporated herein in its entirety by reference.

BACKGROUND

The present disclosure relates to a radio repeater, a sound quality adjustment system, and a sound quality adjustment method.

In a radio device of a half-duplex communication system, in order to let a user easily listen to a voice output from a terminal, the sound quality of the voice is corrected by an equalizer provided inside the terminal before it is output. However, an appropriate correction value in the sound quality correction varies depending on, for example, the language used by the user who uses the radio device. Therefore, in order to obtain the appropriate correction value, an engineer needs to go to the place where the terminal is installed and let users actually try to perform a wireless call so that an optimal correction value is determined by adjusting the correction value and getting a feedback from the user.

Japanese Unexamined Patent Application Publication No. 2013-135320 discloses a technique of setting a parameter of an equalizer of a television display apparatus from a tablet terminal. In Japanese Unexamined Patent Application Publication No. 2013-135320, the tablet terminal records a voice output from the television display apparatus, and transmits the recorded data and a request for analyzing this data to a server. The server analyzes the recorded data, creates the parameter of the equalizer, and transmits the created parameter to the tablet terminal. The tablet terminal transmits the received parameter to the television display apparatus. The television display apparatus sets the received parameter in the equalizer.

SUMMARY

In Japanese Unexamined Patent Application Publication No. 2013-135320, the configuration of the parameter of the equalizer of the television display apparatus that corresponds to a voice output terminal is changed. If the above technique disclosed in Japanese Unexamined Patent Application Publication No. 2013-135320 is applied to the adjustment operation for the sound quality correction in the aforementioned radio device of the half-duplex communication system, it is required to repeat the adjustment while changing the configurations of all the terminals. It takes a relatively large amount of time to change the configurations. This problem becomes more serious as the number of terminals becomes larger.

Further, Japanese Unexamined Patent Application Publication No. 2013-135320 automatically adjusts the frequency characteristic assuming that a desired frequency characteristic is known in advance. However, since the parameter for the appropriate sound quality correction varies depending on the language or the like used by the user who uses the radio device, it is difficult to know the desired frequency characteristic in advance. Therefore, the user needs to actually listen to the voice and then the appropriate parameter needs to be determined based on the evaluation made by the user. Accordingly, it is difficult to apply the above technique disclosed in Japanese Unexamined Patent Application Publication No. 2013-135320 to the adjustment operation for the sound quality correction in the aforementioned radio device of the half-duplex communication system.

A first aspect of the present embodiment provides a radio repeater comprising: a reception unit configured to receive a radio signal from a first radio terminal that performs half-duplex communication; a relay equalizer configured to adjust a frequency characteristic of the radio signal based on a configuration; a configuration reflection unit configured to reflect configuration information on the frequency characteristic received via a communication line in a configuration of the relay equalizer; and a transmission unit configured to transmit the radio signal that has been adjusted to a second radio terminal that performs half-duplex communication.

A second aspect of the present embodiment provides a sound quality adjustment system including first and second radio terminals configured to perform half-duplex communication; a radio repeater that includes a relay equalizer configured to adjust a frequency characteristic of a radio signal based on a configuration and relays a radio signal between the first and second radio terminals; and a management apparatus connected to the radio repeater via a communication line, in which each of the first and second radio terminals setting off an equalizer of each of the first and second radio terminals, the management apparatus transmits a first configuration information on the frequency characteristic to the radio repeater via the communication line, the radio repeater reflects the first configuration information received from the management apparatus in the configuration of the relay equalizer, the first radio terminal transmits a first radio signal for the second radio terminal to the radio repeater, the radio repeater adjusts a frequency characteristic of the first radio signal that has been received based on the configuration in the relay equalizer, and the radio repeater transmits the first radio signal that has been adjusted to the second radio terminal.

A third aspect of the present embodiment provides a sound quality adjustment method including: setting off, in each of first and second radio terminals, each comprising an equalizer, the equalizer of each of the first and second radio terminals configured to perform half-duplex communication; transmitting, in a management apparatus connected to a radio repeater that relays a radio signal between the first and second radio terminals via a communication line, the radio repeater comprising a relay equalizer configured to adjust a frequency characteristic of the radio signal based on the configuration, first configuration information on the frequency characteristic of the radio signal to the radio repeater via the communication line; reflecting, in the radio repeater, the first configuration information received from the management apparatus in the configuration of the relay equalizer; transmitting a first radio signal for the second radio terminal to the radio repeater in the first radio terminal; adjusting, in the radio repeater, a frequency characteristic of the first radio signal that has been received based on the configuration in the relay equalizer in the radio repeater; and transmitting the first radio signal that has been adjusted to the second radio terminal in the radio repeater.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
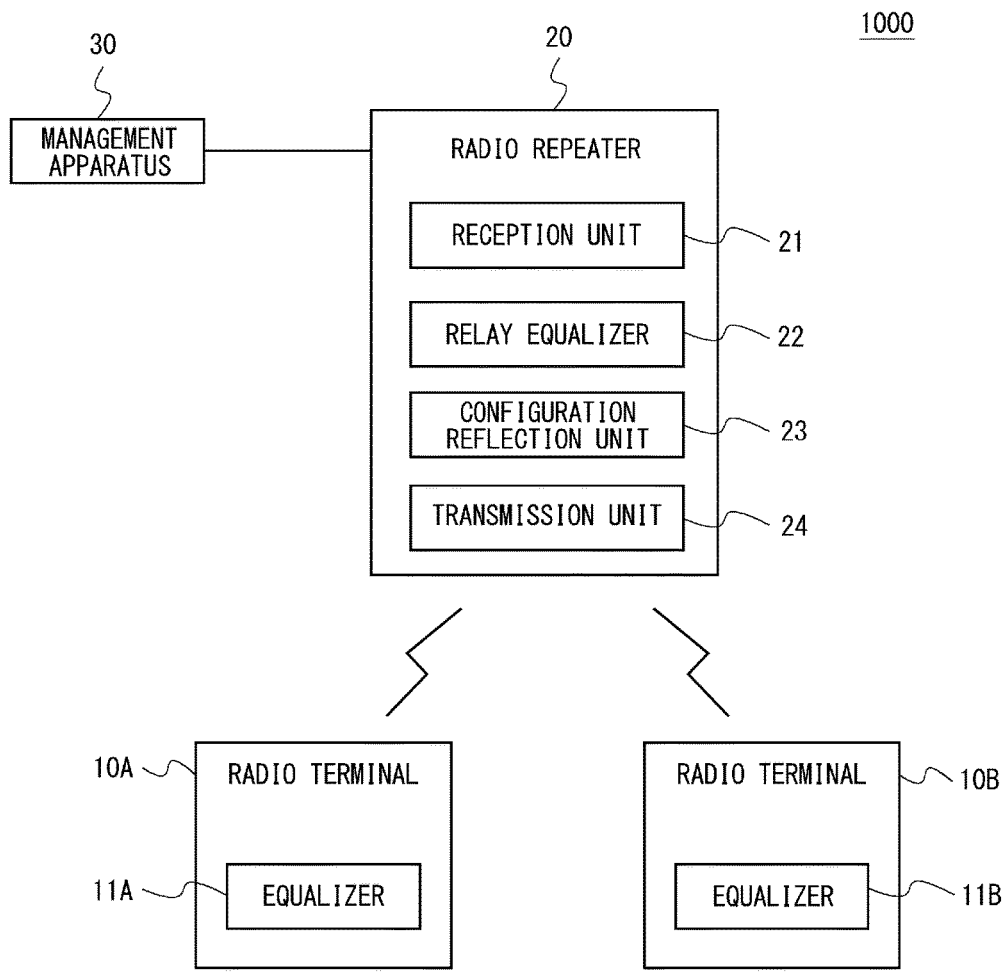
FIG. 1 is a block diagram showing an overall configuration of a sound quality adjustment system 1000 according to a first embodiment.

Specific embodiments will be explained hereinafter in detail with reference to the drawings. In the drawings, the same elements are denoted by the same reference signs, and repetitive descriptions will be avoided as necessary for clarity of explanation.

Figure 13:
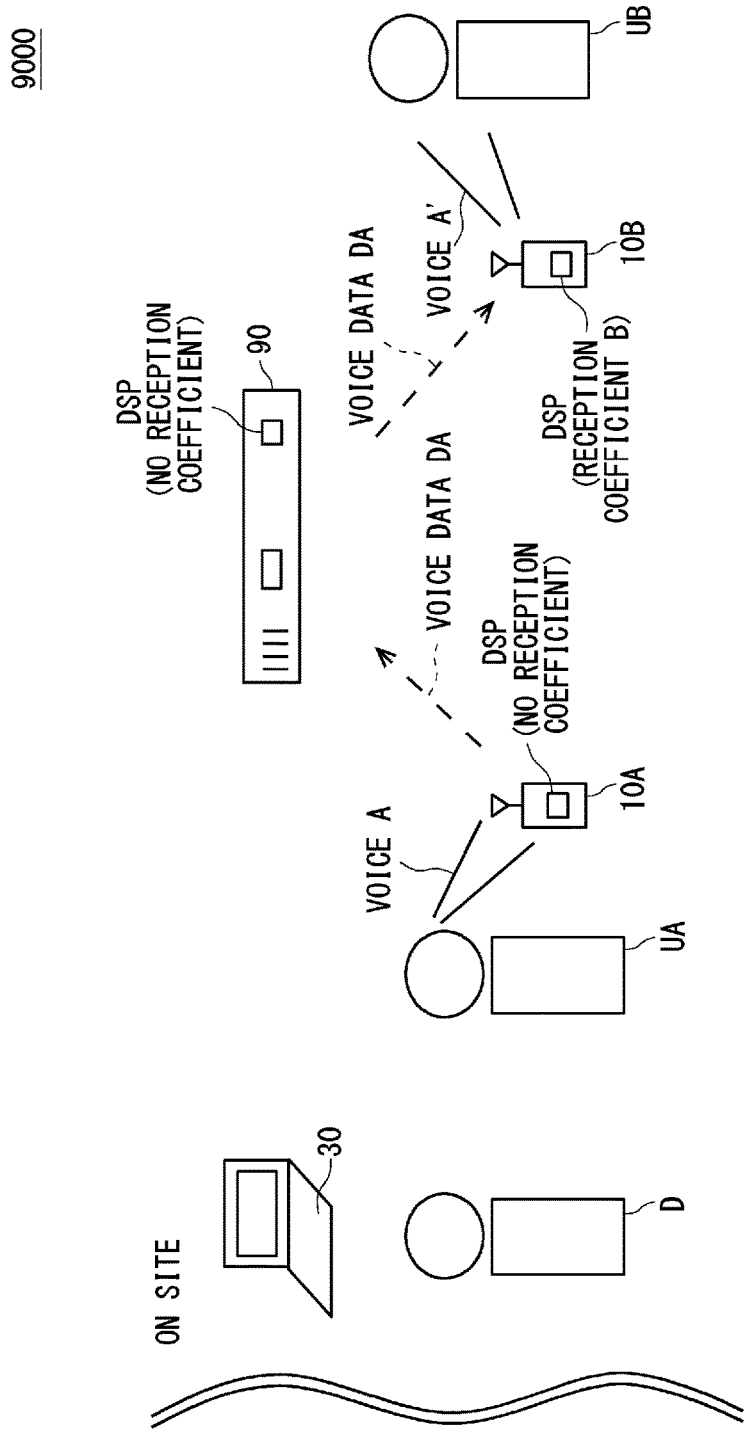
FIG. 13 is a diagram for describing the concept of a process i of a sound quality adjustment operation of a radio communication system 9000 according to related art.
Figure 14:
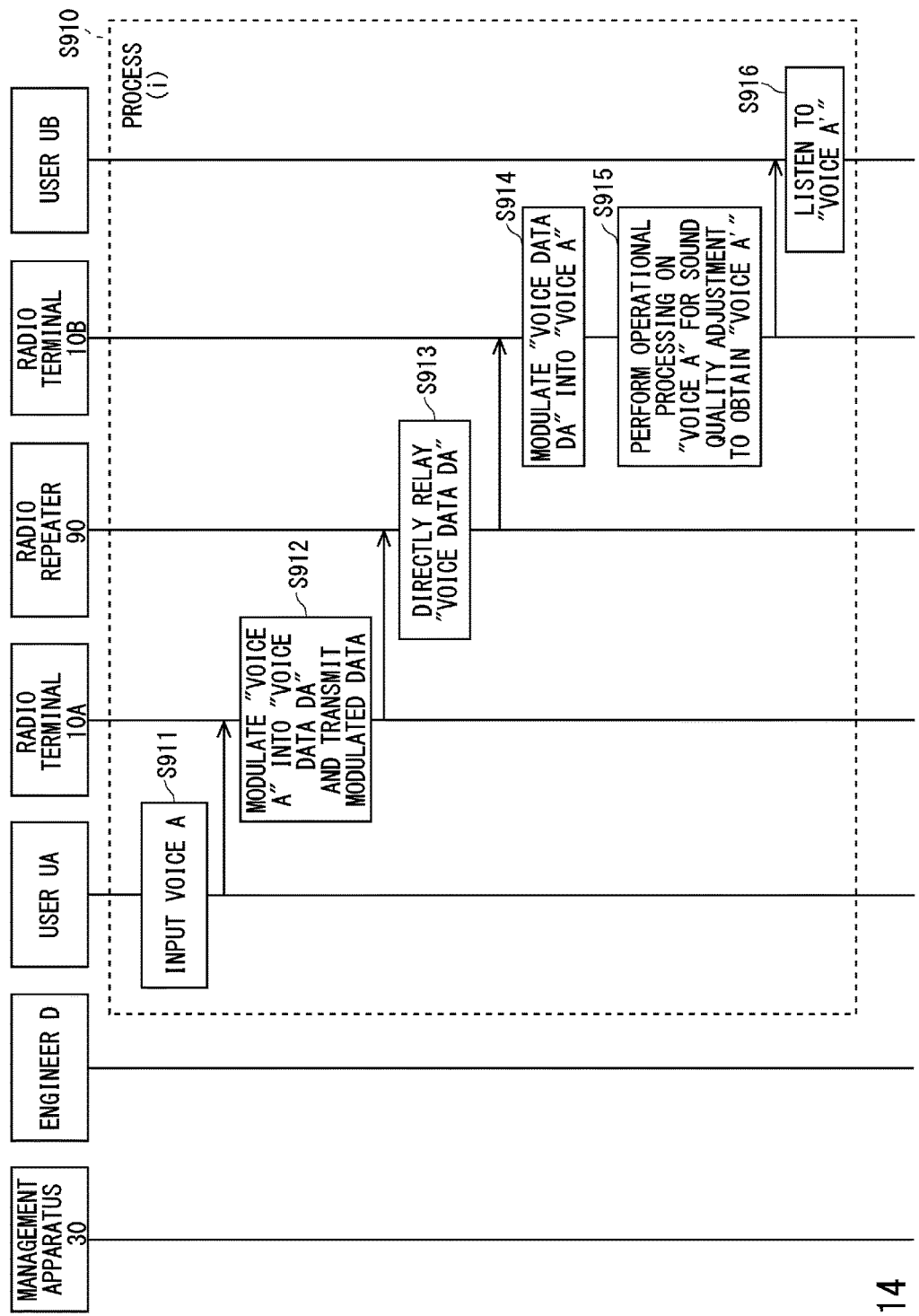
FIG. 14 is a sequence diagram for describing a flow of the process i of the sound quality adjustment operation according to the related art.

First, another aspect of the problem to be solved by the embodiments will be explained. FIG. 13 is a diagram for describing the concept of a process i of a sound quality adjustment operation of a radio communication system 9000 according to related art. Further, FIG. 14 is a sequence diagram for describing a flow of the process i of the sound quality adjustment operation according to the related art.

First, a user UA inputs a voice A to a microphone of a radio terminal 10A (S911). Next, the radio terminal 10A modulates the voice A into a voice data DA by a modulation unit of a transmission circuit, and transmits the voice data DA to a radio repeater 90 (S912). The radio repeater 90 directly transmits the received voice data DA to a radio terminal 10B without multiplying the received voice data DA by a sound quality correction coefficient, thereby performing a relay operation (S913). The radio terminal 10B receives the voice data DA and demodulates the received data into the voice A (S914). Then the radio terminal 10B performs, by a Digital Signal Processor (DSP), processing of multiplying the voice A by a sound quality correction coefficient B and outputs a voice A' that has been subjected to the sound quality adjustment from a speaker (S915). The user UB listens to the voice A' (S916). In the following description, this process will be called a process i (S910).

Figure 15:
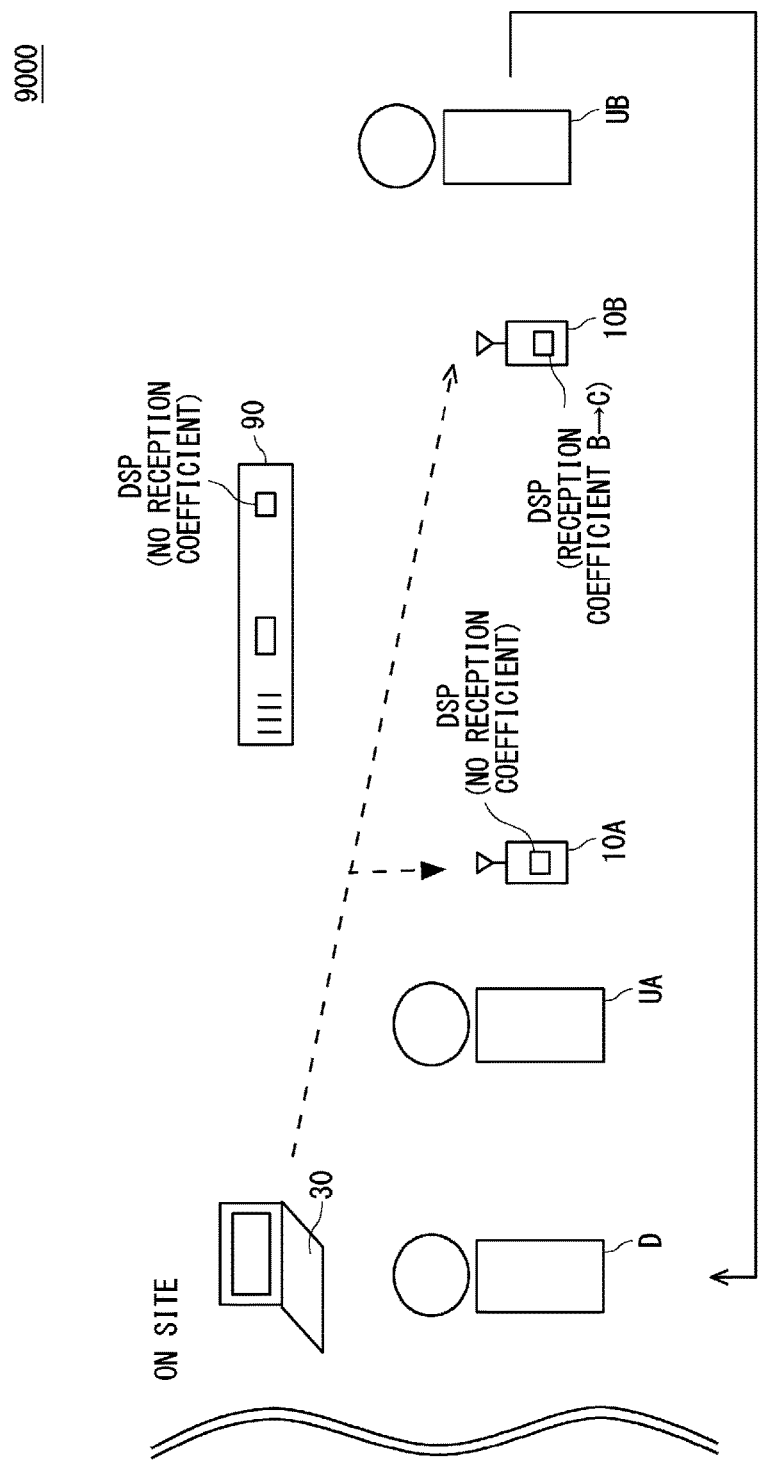
FIG. 15 is a diagram for describing the concept of a process ii of the sound quality adjustment operation of the radio communication system according to the related art.
Figure 16:
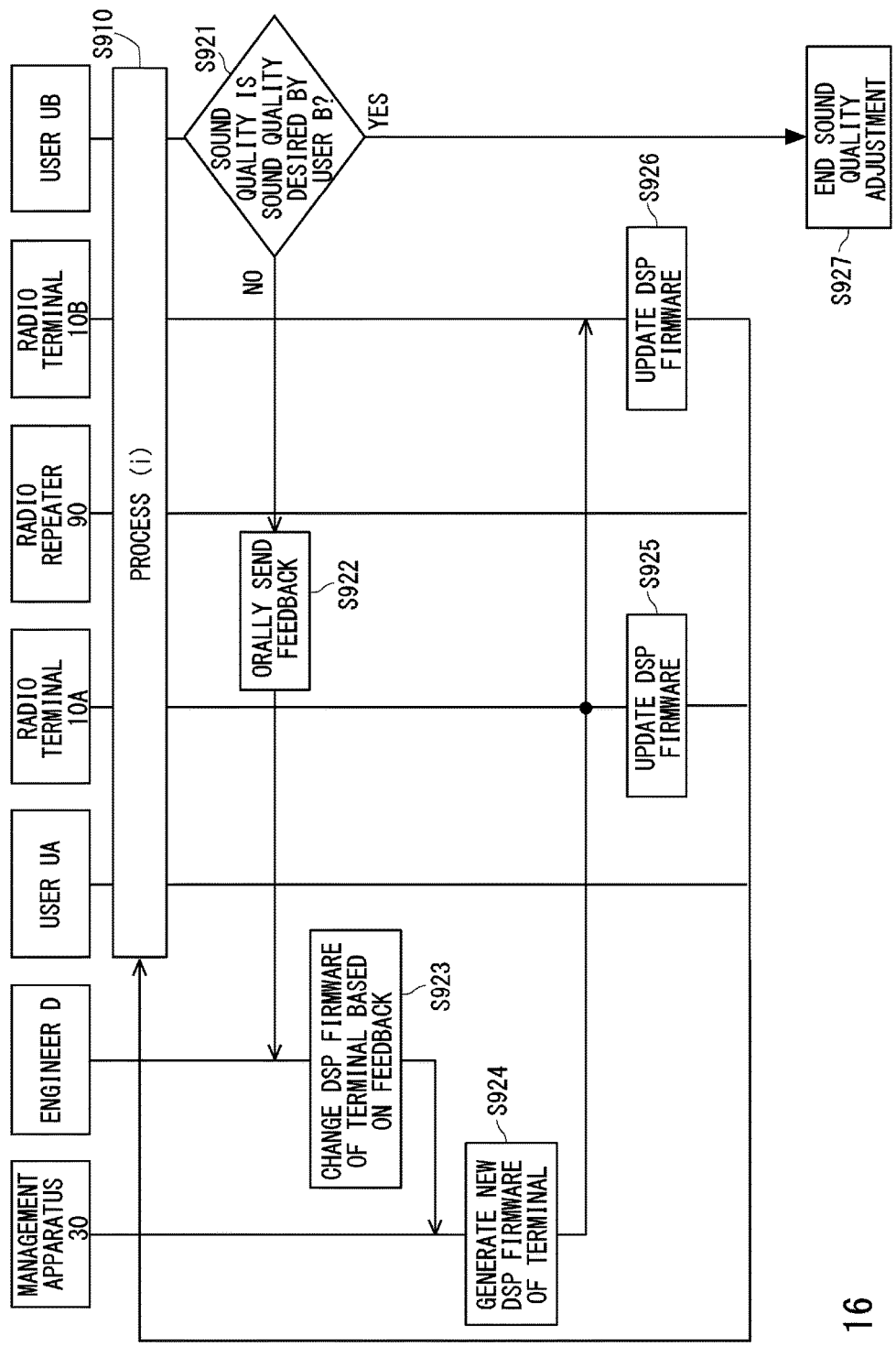
FIG. 16 is a sequence diagram for describing a flow of the process ii of the sound quality adjustment operation according to the related art.

FIG. 15 is a diagram for describing the concept of a process ii of the sound quality adjustment operation of the radio communication system according to the related art. Further, FIG. 16 is a sequence diagram for describing the flow of the process ii of the sound quality adjustment operation according to related art.

After listening to the voice A', the user UB determines whether the sound quality is a desired sound quality (S921). When the sound quality is not the desired sound quality, the user UB orally informs an engineer D of a feedback such as a point that needs to be improved regarding the sound quality adjustment (S922). The user UB may inform the engineer D of the feedback by other means such as by telephone.

The engineer D creates the firmware of the new DSP in which the sound quality correction coefficient has been changed, using a management apparatus 30 based on the feedback (S923 and S924). The management apparatus 30 transmits the new DSP firmware to the radio terminals 10A and 10B and each of the radio terminals 10A and 10B updates the DSP firmware to the new DSP firmware (S925 and S926). This process is called a process ii.

After that, the process i is executed again. When the sound quality is the desired sound quality (YES in S921), the sound quality adjustment is ended (S927).

However, in the aforementioned process, the engineer D needs to go to the place where the terminal is installed, which increases the cost. In particular, since the number of times the process i of the sound quality adjustment operation is repeated cannot be known in advance, there is a problem that the engineer cannot forecast the working hours on site. The embodiments have been made in order to solve the aforementioned problem.

First Embodiment

FIG. 1 is a block diagram showing an overall configuration of a sound quality adjustment system 1000 according to a first embodiment. The sound quality adjustment system 1000 includes radio terminals 10A and 10B, a radio repeater 20, and a management apparatus 30. The radio terminal 10A performs half-duplex communication and includes at least an equalizer 11A inside therein. The radio terminal 10B also performs half-duplex communication and includes at least an equalizer 11B inside therein.

Figure 2:
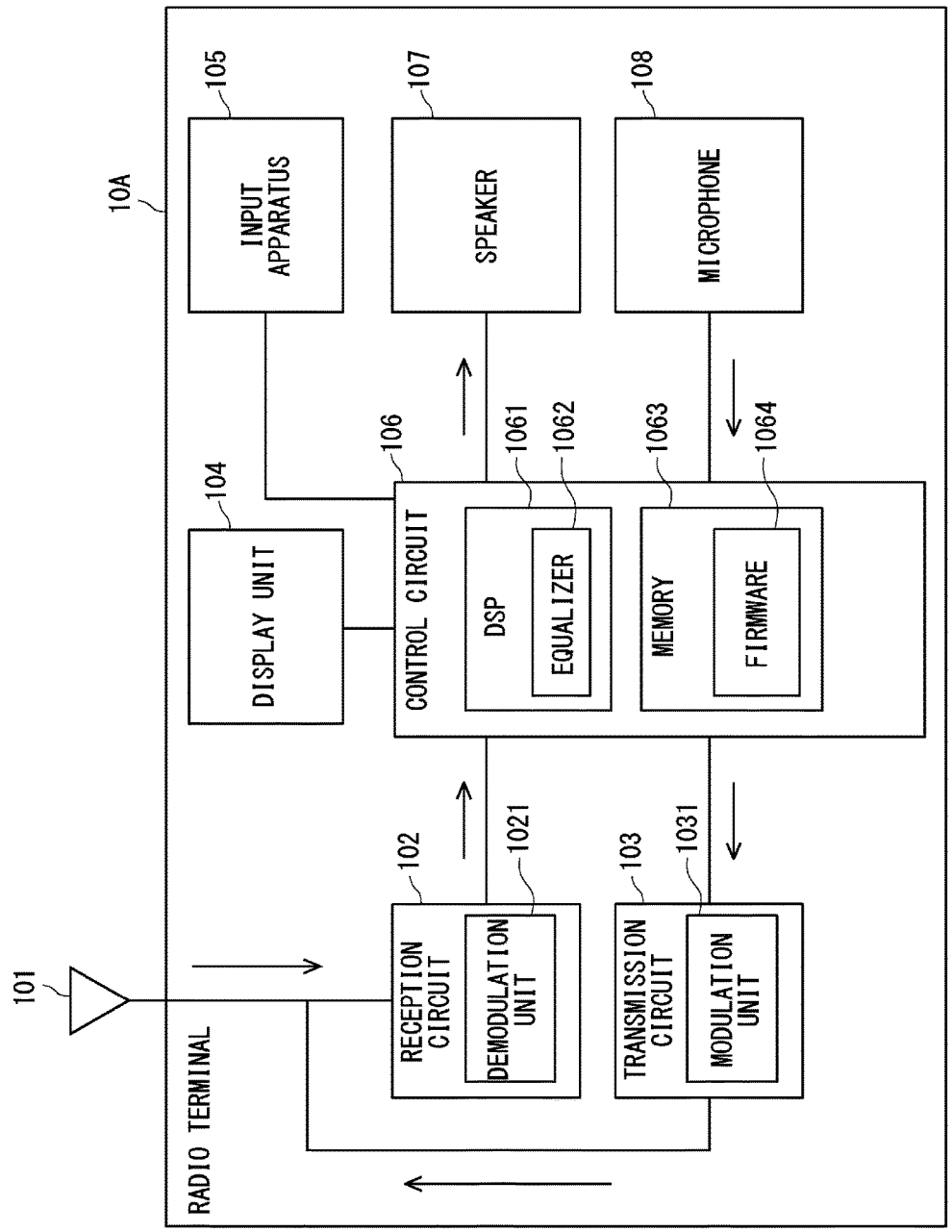
FIG. 2 is a block diagram showing a configuration of a radio terminal 10A according to the first embodiment.

FIG. 2 is a block diagram showing a configuration of the radio terminal 10A according to the first embodiment. While the radio terminal 10A will be explained here as a representative example, the same goes for the radio terminal 10B. The radio terminal 10A includes an antenna 101, a reception circuit 102, a transmission circuit 103, a display unit 104, an input apparatus 105, a control circuit 106, a speaker 107, and a microphone 108.

The reception circuit 102 demodulates a radio signal received by the antenna 101, that is, voice data, by a demodulation unit 1021, and outputs the demodulated signal to the control circuit 106. The transmission circuit 103 modulates the modulated signal input from the control circuit 106 into a carrier signal by a modulation unit 1031, and causes the antenna 101 to transmit the carrier signal as a radio signal.

The display unit 104 is a display apparatus such as a Liquid Crystal Display (LCD), and displays the output from the control circuit 106 on the screen. The input apparatus 105, which is, for example, a numeric keypad, accepts the key input from the user UA, and outputs the input content corresponding to the accepted key input to the control circuit 106. The speaker 107 outputs the voice received from the control circuit 106 by a loudspeaker. The microphone 108 accepts the voice input from the user UA, and outputs the transmission voice signal to the control circuit 106.

The control circuit 106 includes at least a DSP 1061, a memory 1063 and the like. The memory 1063 is a storage area and stores at least a firmware 1064. The firmware 1064 is a control program of the DSP 1061. In particular, the configuration of the sound quality correction coefficient in an equalizer 1062 is defined in the firmware 1064. The firmware 1064 is one example of the configuration information.

The DSP 1061 controls various operations of the radio terminal 10A by loading and executing the firmware 1064. The DSP 1061 encodes the transmission voice signal input from the microphone 108 to generate a modulated signal. Further, the DSP 1061 decodes the demodulated signal input from the reception circuit 102 to generate a reception voice signal. In particular, the DSP 1061 also serves as the equalizer 1062. The equalizer 1062 adjusts the frequency characteristic of the radio signal based on the configuration defined in the firmware 1064. That is, the DSP 1061 performs processing of multiplying the demodulated signal input from the reception circuit 102 by the configured sound quality correction coefficient, and outputs the result of the processing to the speaker 107. Further, the DSP 1061 may output the transmission voice signal input from the microphone 108 to the transmission circuit 103 without multiplying the transmission voice signal by the sound quality correction coefficient.

Referring back to FIG. 1, the explanation will be continued. The radio repeater 20 relays radio signals between the radio terminals 10A and 10B. Further, the radio repeater 20 is connected to the management apparatus 30 via a communication line. The radio repeater 20 includes a reception unit 21, a relay equalizer 22, a configuration reflection unit 23, and a transmission unit 24.

The reception unit 21 receives the radio signal from the radio terminal 10A or 10B. The relay equalizer 22 adjusts the frequency characteristic of the radio signal based on the configuration. The configuration reflection unit 23 reflects the configuration information regarding the frequency characteristic received via the communication line in the configuration of the relay equalizer 22. The transmission unit 24 transmits the radio signal that has been adjusted by the relay equalizer 22 to the radio terminal 10A or 10B. When, for example, the reception unit 21 has received the radio signal from the radio terminal 10A, the transmission unit 24 transmits the radio signal that has been adjusted to the radio terminal 10B. Further, the transmission unit 24 transmits the configuration information to the radio terminals 10A and 10B in response to the instruction received from the management apparatus 30 via the communication line.

Figure 3:
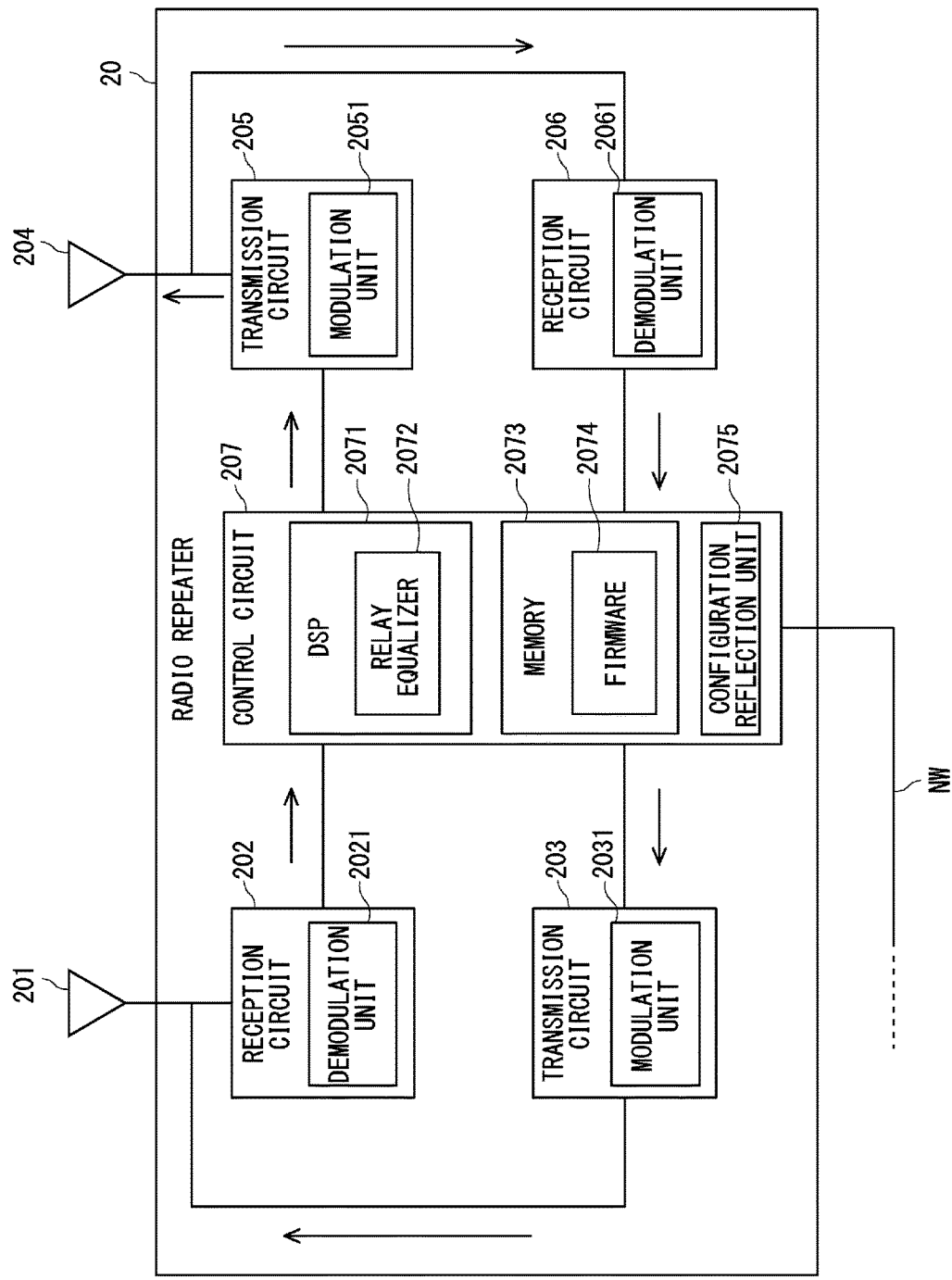
FIG. 3 is a block diagram showing a configuration of a radio repeater 20 according to the first embodiment.

FIG. 3 is a block diagram showing a configuration of the radio repeater 20 according to the first embodiment. The radio repeater 20 includes an antenna 201, a reception circuit 202, a transmission circuit 203, an antenna 204, a transmission circuit 205, a reception circuit 206, and a control circuit 207.

The reception circuit 202 demodulates the radio signal received by the antenna 201 by a demodulation unit 2021, and outputs the demodulated signal to the control circuit 207. The transmission circuit 205 modulates the modulated signal input from the control circuit 207 by a modulation unit 2051, and causes the antenna 204 to transmit the signal as the radio signal. In a similar way, the reception circuit 206 demodulates the radio signal received by the antenna 204 by a demodulation unit 2061, and outputs the demodulated signal to the control circuit 207. The transmission circuit 203 modulates the modulated signal input from the control circuit 207 by a modulation unit 2031, and causes the antenna 201 to transmit the signal as the radio signal.

The control circuit 207 includes at least a DSP 2071, a memory 2073, and a configuration reflection unit 2075. Further, the control circuit 207 is connected to a network line NW, which is a communication line. The memory 2073 is a storage area, and stores at least a firmware 2074. The firmware 2074 is a control program of the DSP 2071. In particular, the configuration of the sound quality correction coefficient of a relay equalizer 2072 is defined in the firmware 2074. The firmware 2074 is one example of the configuration information.

The DSP 2071 controls various operations of the radio repeater 20 by loading and executing the firmware 2074. In particular, the DSP 2071 also serves as the relay equalizer 2072. The relay equalizer 2072 adjusts the frequency characteristic of the radio signal based on the configuration defined in the firmware 2074. That is, the DSP 2071 performs processing of multiplying the demodulated signal input from the reception circuit 202 or 206 by the configured sound quality correction coefficient, and outputs the resulting signal to the transmission circuit 205 or 203 as the modulated signal. More specifically, the DSP 2071 decodes the demodulated signal input from the reception circuit 202 or 206, performs processing of multiplying the decoded signal by the configured sound quality correction coefficient, encodes the obtained signal, and outputs the resulting signal to the transmission circuit 205 or 203 as the modulated signal.

When the configuration reflection unit 2075 has received various information items from the management apparatus 30 via the network line NW, the configuration reflection unit 2075 performs processing in accordance with the received information. When, for example, the configuration reflection unit 2075 has received the firmware of the radio repeater 20 from the management apparatus 30, the configuration reflection unit 2075 overwrites the existing data by the obtained data and stores the obtained data in the memory 2073 as the firmware 2074. Further, when the configuration reflection unit 2075 has received the firmware of the radio terminals 10A and 10B from the management apparatus 30, the configuration reflection unit 2075 outputs the firmware to the transmission circuit 203 and the transmission circuit 205 and causes the transmission circuit 203 and the transmission circuit 205 to transfer the firmware to the radio terminals 10A and 10B.

Referring back to FIG. 1, the explanation will be continued. The management apparatus 30 is an information processing apparatus connected to the radio repeater 20 via the communication line. The management apparatus 30 is able to perform correction or the like of the firmware in accordance with the operation by the engineer D. Further, the management apparatus 30 is able to transmit or receive data to or from the radio repeater 20 via the communication line. In particular, the management apparatus 30 creates the firmware for the radio repeater 20 and transmits the created firmware to the radio repeater 20 via the communication line. Further, the management apparatus 30 creates a firmware for the radio terminals 10A and 10B and transmits the created firmware to the radio repeater 20 via the communication line.

The management apparatus 30 accepts an evaluation in accordance with the voice output in the radio terminal 10B. When, for example, the engineer D has listened to the evaluation orally by, for example, telephone, from the user UB, the engineer D inputs the evaluation via the input apparatus 302. Accordingly, the management apparatus 30 accepts the evaluation. Alternatively, when the radio terminal 10B includes the function of accepting the input of the evaluation and the transmission function, the management apparatus 30 may electronically accept the evaluation from the communication line via the radio repeater 20 from the radio terminal 10B. Then the management apparatus 30 corrects the firmware of the radio repeater 20 in accordance with the evaluation to generate a firmware for updating. After that, the management apparatus 30 transmits the firmware for updating to the radio repeater 20 via the communication line.

Figure 4:
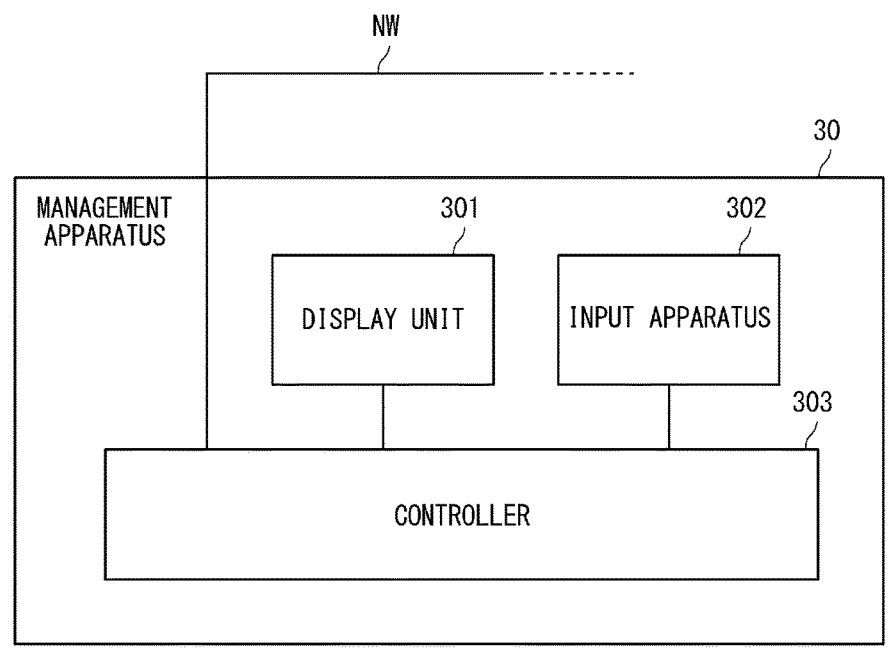
FIG. 4 is a block diagram showing a configuration of a management apparatus 30 according to the first embodiment.

FIG. 4 is a block diagram showing a configuration of the management apparatus 30 according to the first embodiment. The management apparatus 30 is connected to the radio repeater 20 via the network line NW. The management apparatus 30 includes a display unit 301, an input apparatus 302, and a controller 303. The display unit 301 is a display apparatus such as a Liquid Crystal Display (LCD), and displays the output from the controller 303 on the screen. The display unit 301 may have a configuration different from that of the management apparatus 30. The input apparatus 302 is an input device such as a keyboard. The controller 303 is a control apparatus such as a Central Processing Unit (CPU). The controller 303 further includes a storage apparatus (not shown). A control program such as an OS is stored in the storage apparatus. The controller 303 controls various operations of the management apparatus 30 by loading a control program from the storage apparatus and executing the loaded program.

Figure 5:
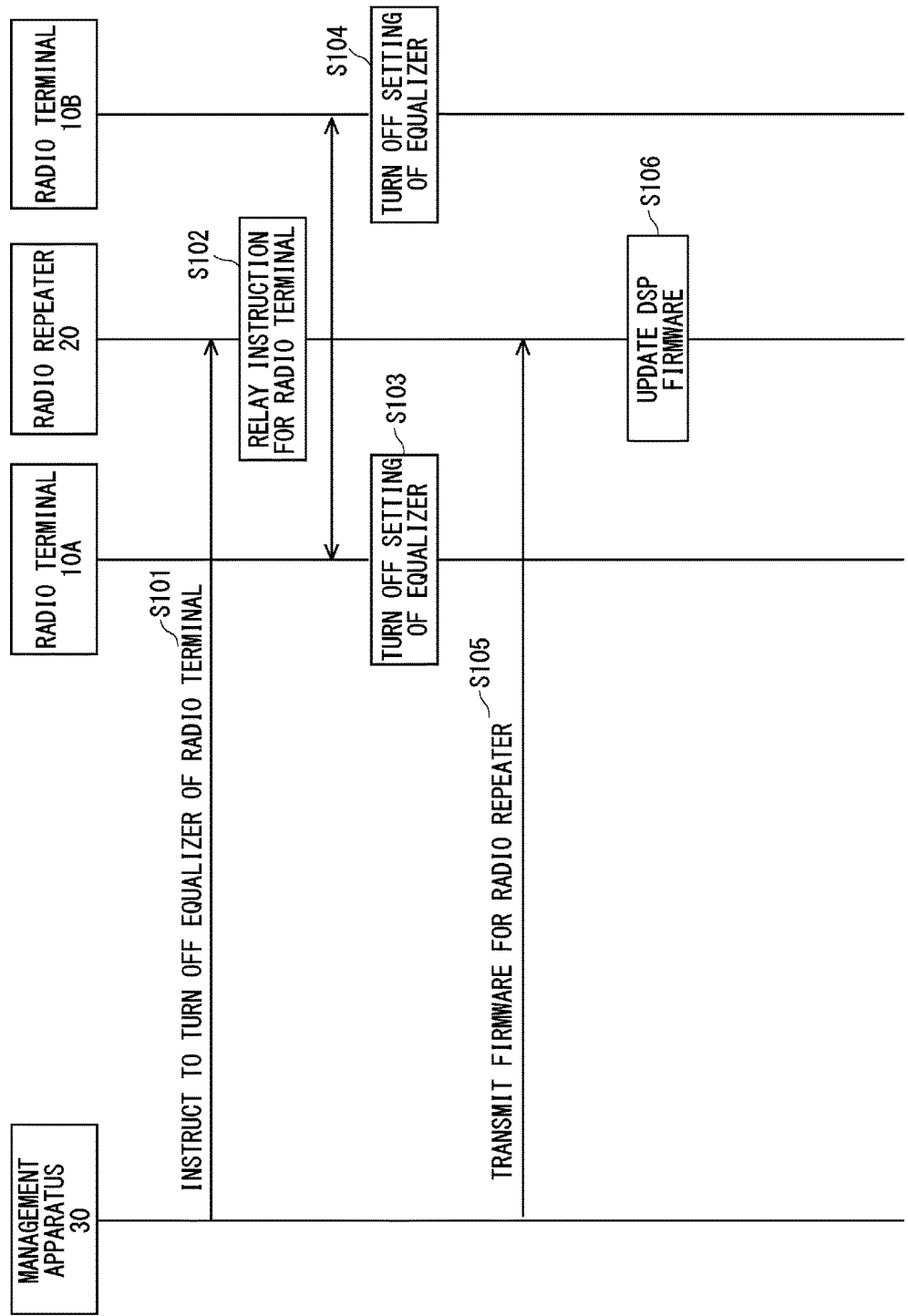
FIG. 5 is a sequence diagram for describing a flow of preprocessing of a sound quality adjustment operation according to the first embodiment.

FIG. 5 is a sequence diagram for describing a flow of preprocessing of the sound quality adjustment operation according to the first embodiment. It is assumed that the state is as shown in FIG. 13. The management apparatus 30 transmits an instruction to set off the equalizer of the radio terminals 10A and 10B to the radio repeater 20 (S101). Next, the radio repeater 20 relays the received instruction for the radio terminal (S102). That is, the radio repeater 20 transfers the received instruction to the radio terminals 10A and 10B. Then the radio terminals 10A and 10B set off the equalizers of the radio terminals 10A and 10B in accordance with the received instruction (S103 and S104).

The "instruction" in Step S101 may be a firmware in which the equalizers for the radio terminals 10A and 10B are set off. That is, the sound quality correction coefficient is not configured in this firmware. In this case, the radio repeater 20 transfers the firmware that has been received to the radio terminals 10A and 10B. Then the radio terminals 10A and 10B update the received firmware as the firmware of the DSP.

Further, the management apparatus 30 transmits the firmware for the radio repeater 20 to the radio repeater 20 (S105). The firmware for the radio repeater 20 is one example of first configuration information, and is a firmware in which the sound quality correction coefficient is set to a predetermined value. Then the radio repeater 20 updates the received firmware as the firmware of the DSP (S106). That is, the radio repeater 20 reflects the received first configuration information in the relay equalizer 2072. More specifically, the configuration reflection unit 2075 overwrites the existing data by the received firmware and stores the received firmware in the memory 2073 as the firmware 2074, and the DSP 2071 reads out the firmware 2074 from the memory 2073 and executes the firmware 2074.

The order of Steps S101-S104 and Steps S105 and S106 may be reversed.

Figure 6:
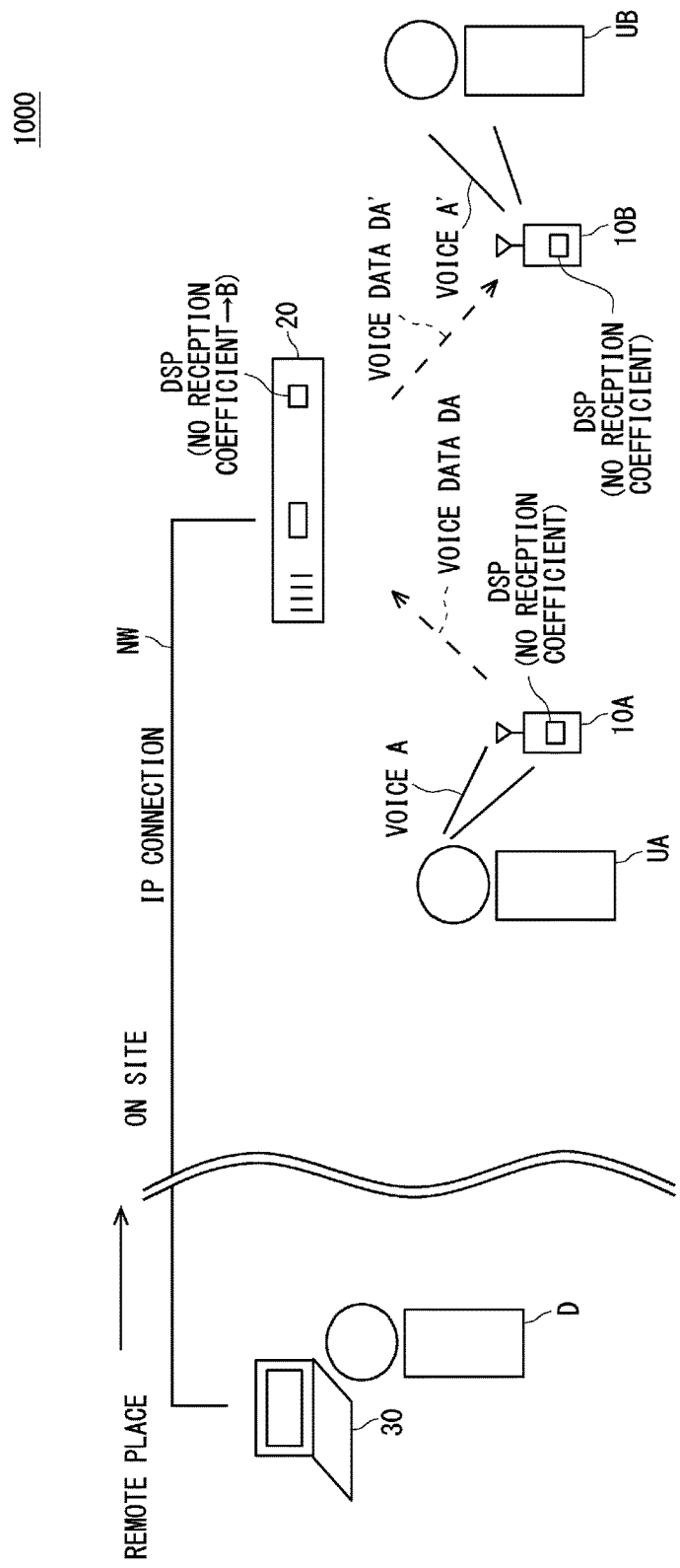
FIG. 6 is a diagram for describing the concept of a process i' of the sound quality adjustment operation of the sound quality adjustment system according to the first embodiment.
Figure 7:
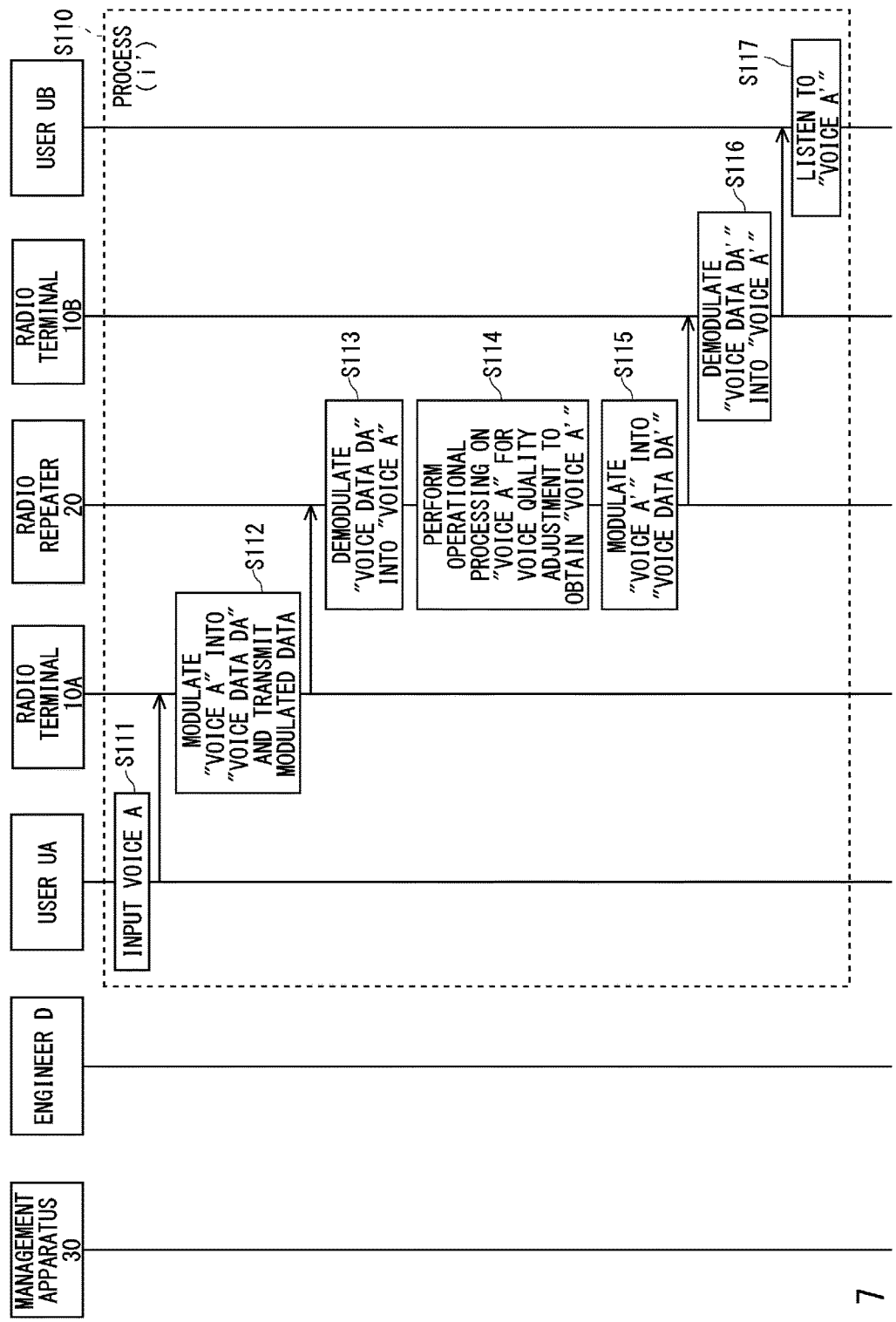
FIG. 7 is a sequence diagram for describing a flow of the process i' of the sound quality adjustment operation according to the first embodiment.

FIG. 6 is a diagram for describing the concept of the process i' of the sound quality adjustment operation of the sound quality adjustment system according to the first embodiment. FIG. 7 is a sequence diagram for describing a flow of the process i' of the sound quality adjustment operation according to the first embodiment.

First, the user UA inputs the voice A to the microphone 108 of the radio terminal 10A (S111). Next, the radio terminal 10A modulates the voice A into the voice data DA by the modulation unit 1031 of the transmission circuit 103, and transmits the voice data DA to the radio repeater 20 (S112). That is, the radio terminal 10A transmits the radio signal for the radio terminal 10B to the radio repeater 20.

The radio repeater 20 demodulates the received voice data DA into voice A by the demodulation unit 2021 of the reception circuit 202 (S113). Then the radio repeater 20 performs processing of multiplying the demodulated voice A by the sound quality correction coefficient B in the relay equalizer 2072 of the DSP 2071 to obtain voice A' (S114). Next, the radio repeater 20 modulates the voice A' that has been subjected to the sound quality adjustment into voice data DA' by the modulation unit 2051 of the transmission circuit 205 (S115), and transmits the modulated data to the radio terminal 10B. That is, the radio repeater 20 adjusts the frequency characteristic of the radio signal that has been received based on the configuration in the relay equalizer 2072, and transmits the radio signal that has been adjusted to the radio terminal 10B.

Note that the radio repeater 20 does not necessarily demodulate the voice data into a voice and carry out the sound quality adjustment. The radio repeater 20 may directly perform, for example, the sound quality adjustment on the voice data.

The radio terminal 10B receives the voice data DA', demodulates this data into voice A' without multiplying this data by the sound quality correction coefficient (S116), and outputs the demodulated data from the speaker. The user UB listens to the voice A' (S117).

As described above, in this embodiment, unlike in the aforementioned process in FIG. 13 etc. stated above, the process in which the sound quality correction coefficient B is reflected in the voice A is executed in the radio repeater 20. Further, in this embodiment, the radio terminal 10B does not configure the sound quality correction coefficient, and does not execute the sound quality correction coefficient processing on the received voice.

Figure 8:
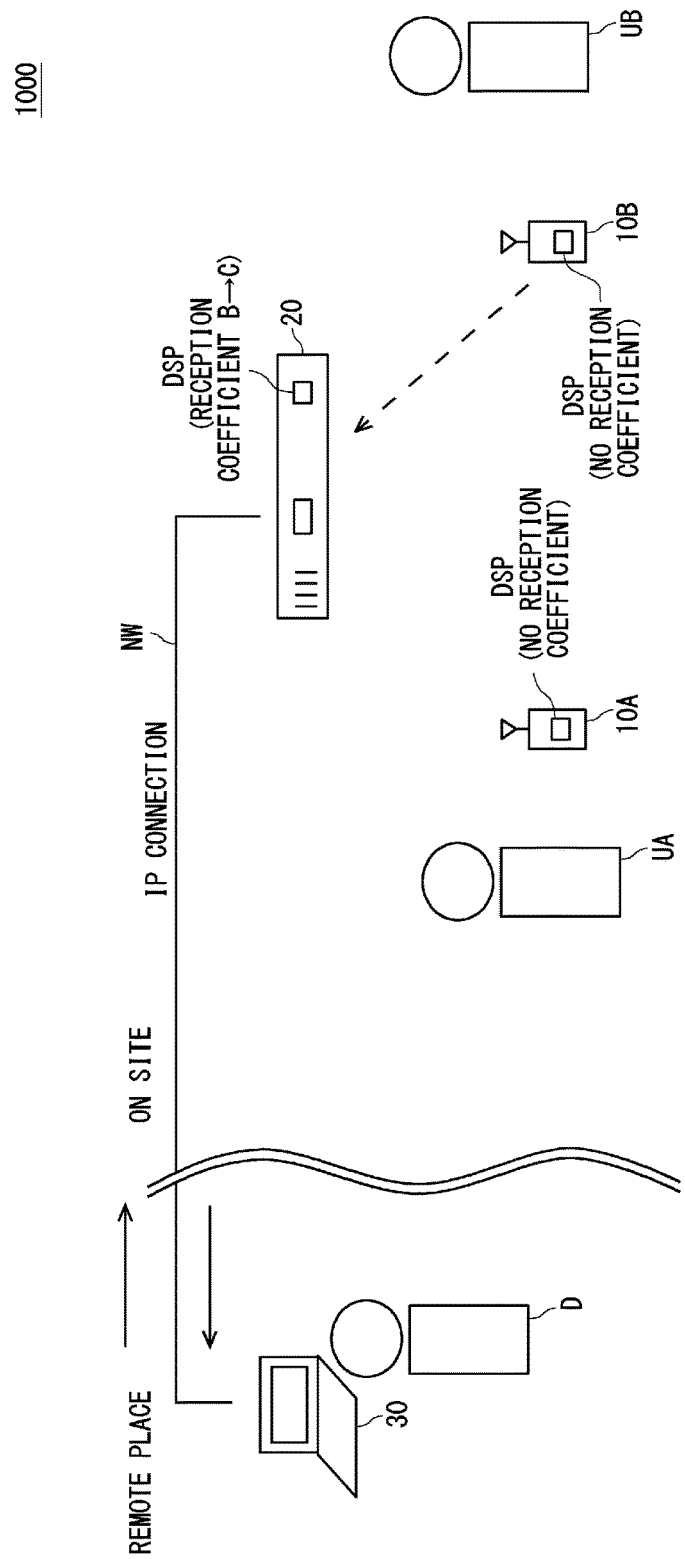
FIG. 8 is a diagram for describing the concept of a process ii' of the sound quality adjustment operation of the sound quality adjustment system according to the first embodiment.
Figure 9:
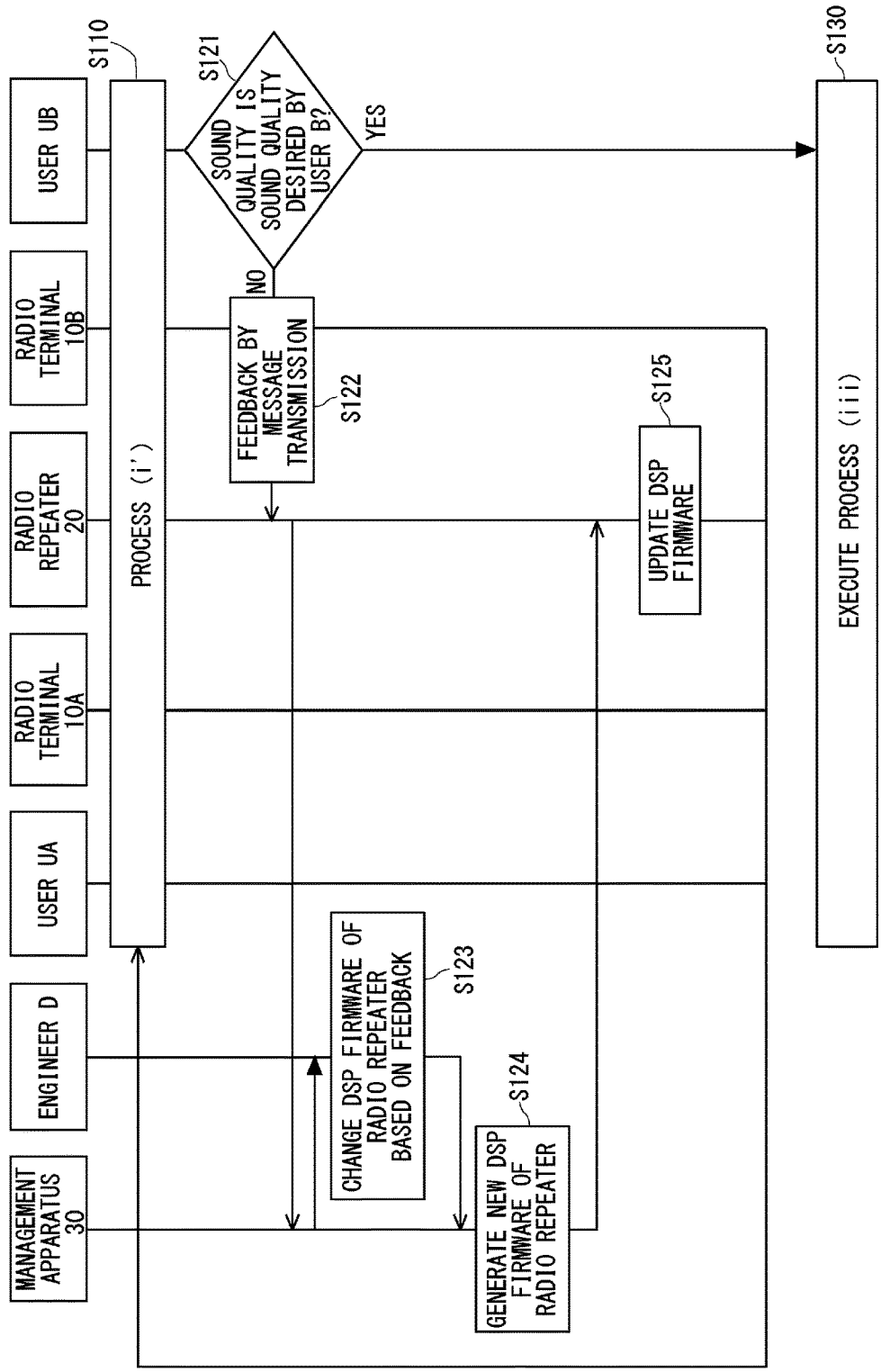
FIG. 9 is a sequence diagram for describing the flow of the process ii' of the sound quality adjustment operation according to the first embodiment.

FIG. 8 is a diagram for describing the concept of the process ii' of the sound quality adjustment operation of the sound quality adjustment system according to the first embodiment. Further, FIG. 9 is a sequence diagram for describing a flow of the process ii' of the sound quality adjustment operation according to the first embodiment.

The user UB determines whether the sound quality is the desired sound quality after listening to the voice A' (S121). When the sound quality is not the desired sound quality, the user UB inputs characters from the input apparatus 105 of the radio terminal 10B, and transmits the feedback by the message data (S122). In other words, the radio terminal 10B accepts the evaluation of the sound quality in accordance with the input from the user UB and transmits the accepted evaluation to the radio repeater 20 as message data. The radio repeater 20 transfers the evaluation received from the radio terminal 10B to the management apparatus 30 via the network line NW.

The management apparatus 30 receives the message data from the radio repeater 20 via the network line NW and displays the evaluation on the display unit 301. The engineer D obtains, from the content displayed on the display unit 301, the feedback of the evaluation regarding the sound quality obtained from the user UB. The engineer D may obtain the feedback from the user UB by telephone, E-mail, or other means. Further, the engineer D may be able to listen to one or both of the voice A and the voice A' in the management apparatus 30. In this case, the radio repeater 20 may transmit the voice A received from the radio terminal 10A and the voice A' that has been subjected to the sound quality adjustment also to the management apparatus 30 via the network line NW, and the management apparatus 30 may output the received voice A and the received voice A' from the speaker or the like.

The engineer D creates the firmware of the new DSP in which the sound quality correction coefficient has been changed using the management apparatus 30 based on the feedback (S123 and S124). In other words, the management apparatus 30 changes the sound quality correction coefficient in accordance with the input of the engineer D and generates the DSP firmware for the radio repeater 20. The management apparatus 30 transmits the new DSP firmware to the radio repeater 20 via the network line NW. The radio repeater 20 overwrites the existing data by the received new DSP firmware and stores the received new DSP firmware in the memory 2073 so as to update the DSP firmware (S125). Accordingly, the sound quality correction coefficient is changed to a new sound quality correction coefficient. This process is called a process ii'. This new DSP firmware is one example of second configuration information.

After that, the process i' and the process ii' are repeated. Further, the process i' and the process ii' may be performed once or may be repeated multiple times. When the sound quality is the desired sound quality (YES in S121), the process goes to the process iii (S130).

Figure 10:
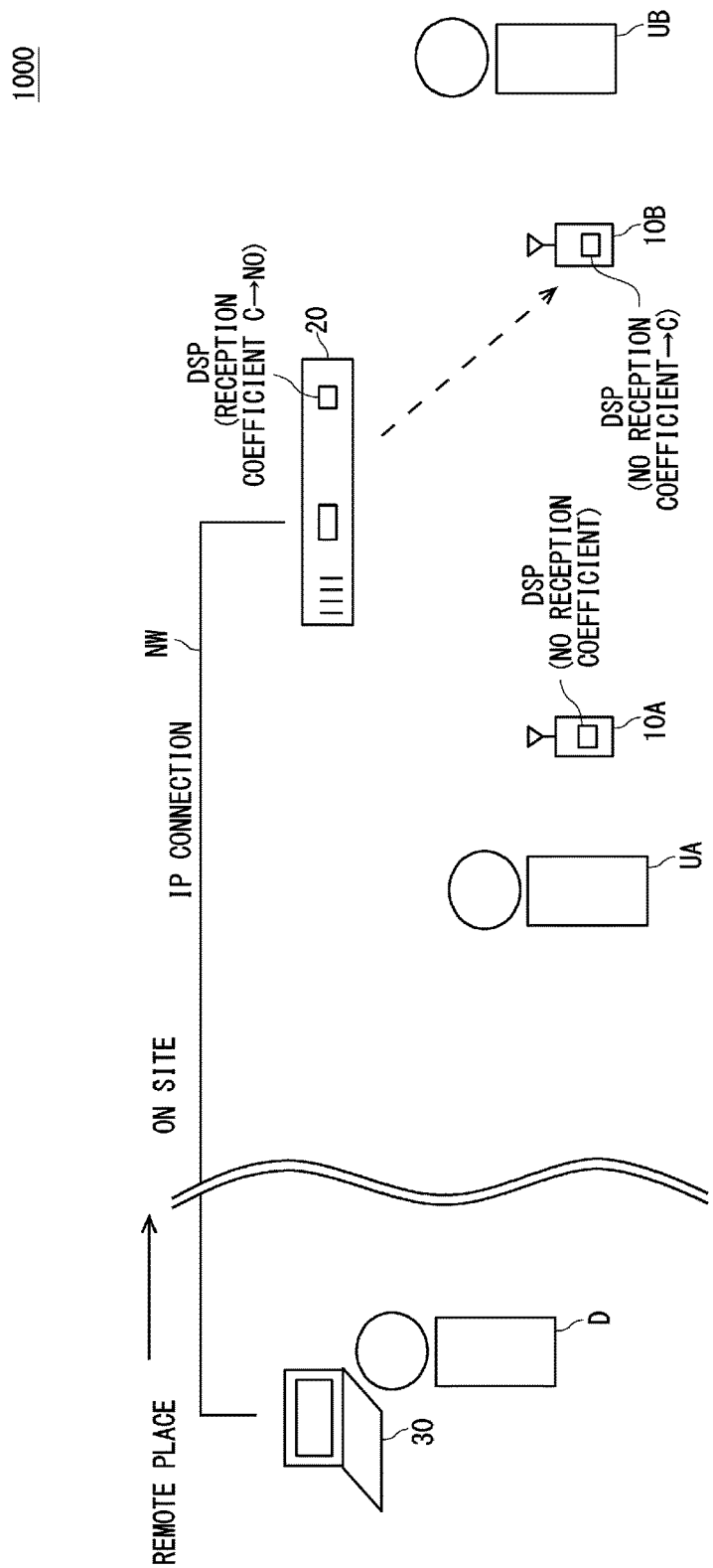
FIG. 10 is a diagram for describing the concept of a process iii of the sound quality adjustment operation of the sound quality adjustment system according to the first embodiment.
Figure 11:
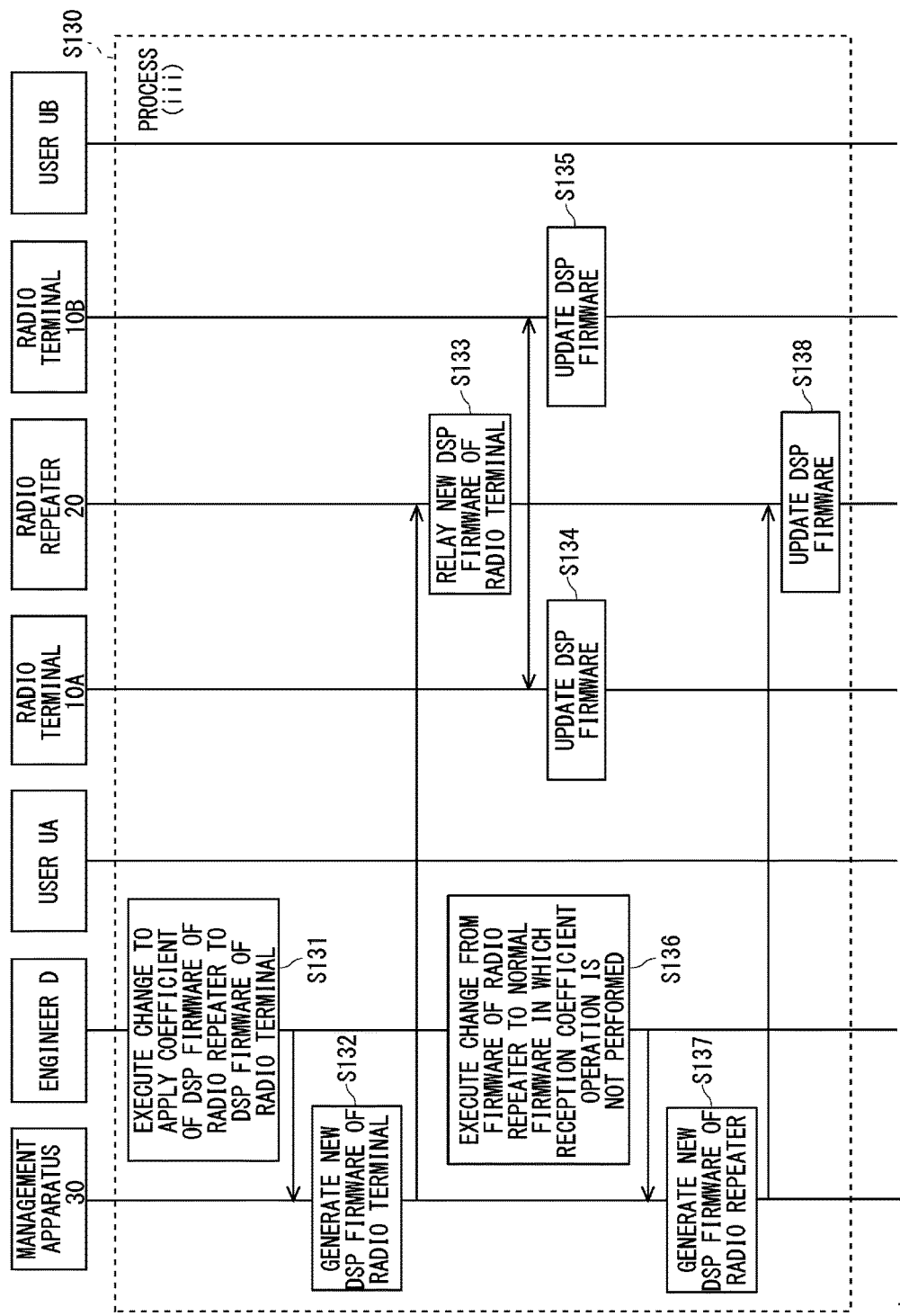
FIG. 11 is a sequence diagram for describing a flow of the process iii of the sound quality adjustment operation according to the first embodiment.

FIG. 10 is a diagram for describing the concept of the process iii of the sound quality adjustment operation of the sound quality adjustment system according to the first embodiment. Further, FIG. 11 is a sequence diagram for describing the flow of the process iii of the sound quality adjustment operation according to the first embodiment. The engineer D creates the DSP firmware in which the sound quality correction coefficient of the DSP firmware of the radio repeater 20 has been configured for the radio terminals 10A and 10B using the management apparatus 30 (S131 and S132). In other words, the management apparatus 30 changes the sound quality correction coefficient to the one for the radio repeater 20 that has already been adjusted in accordance with the input of the engineer D to generate the DSP firmware for the radio terminals 10A and 10B. Then the management apparatus 30 transmits the DSP firmware for the radio terminals 10A and 10B in which the new sound quality correction coefficient has been configured to the radio repeater 20 via the network line NW. The DSP firmware for the radio terminals 10A and 10B in which the new sound quality correction coefficient has been configured is one example of third configuration information.

The radio repeater 20 relays the received DSP firmware for the radio terminals 10A and 10B and transfers the DSP firmware to each of the radio terminals 10A and 10B (S133). Each of the radio terminals 10A and 10B updates the DSP firmware to the new DSP firmware (S134 and S135). Accordingly, in each of the radio terminals 10A and 10B, the DSP firmware is updated to the new DSP firmware in which the appropriate sound quality correction coefficient is configured, and thus the appropriate sound quality adjustment is reflected.

Further, the engineer D creates the DSP firmware for the radio repeater 20 that does not have a sound quality correction coefficient using the management apparatus 30 (S136 and S137). In other words, the management apparatus 30 generates the DSP firmware for the radio repeater 20 in which the configuration of the sound quality correction coefficient has been set off in accordance with the input of the engineer D. Then the management apparatus 30 transmits the DSP firmware for the radio repeater 20 that does not have a sound quality correction coefficient to the radio repeater 20 via the network line NW. Then the radio repeater 20 updates the received firmware as the firmware of the DSP (S138). This process is called a process iii.

As described above, in this embodiment, unlike in the aforementioned process ii in FIG. 15 and the like, it is possible to change the sound quality correction coefficient of the equalizer of the radio repeater 20 and adjust the sound quality by the transmission of the feedback by the message data via the radio repeater 20 and the DSP firmware update of the radio repeater 20 from a remote place. Therefore, even when the engineer D does not go to the place where the terminal is installed, it is possible to change the sound quality in accordance with the feedback of the user UB on site. Further, there is no need to change the firmware of each of the radio terminals 10A and 10B each time, whereby the complexity can be reduced.

A plurality of radio repeaters may be provided between the radio terminal 10A and the radio terminal 10B. In this case, the existing firmware may be replaced by the firmware in which the sound quality correction coefficient has been configured in at least one of the plurality of radio repeaters and then the sound quality adjustment may be performed.

Second Embodiment

A second embodiment is a modified example of the aforementioned first embodiment. That is, the radio repeater further includes a determination unit that determines whether the first radio terminal and the second radio terminal belong to a specific group when the first radio signal is received. When it has been determined that they belongs to the specific group, the adjustment is performed by the relay equalizer. Accordingly, even while the sound quality adjustment according to the first embodiment is being executed, it is possible to continue the relay between the radio terminals that belong to a group other than the specific group and to perform the sound quality adjustment of the specific group without inhibiting the normal operation of the other group.

Figure 12:
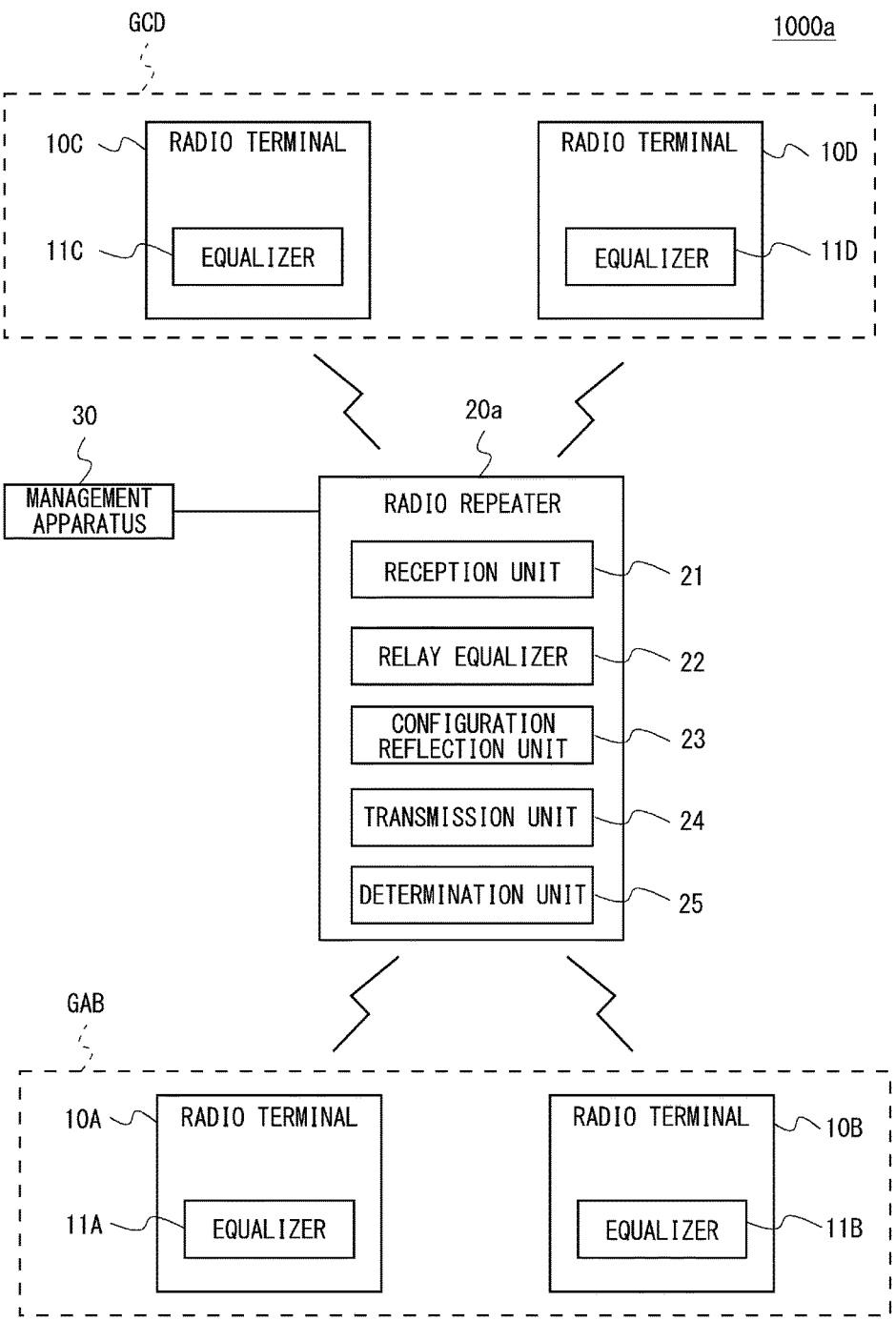
FIG. 12 is a block diagram showing an overall configuration of a sound quality adjustment system 1000a according to a second embodiment.

FIG. 12 is a block diagram showing an overall configuration of a sound quality adjustment system 1000a according to the second embodiment. The sound quality adjustment system 1000a includes radio terminals 10A and 10B that belong to a specific group GAB, radio terminals 10C and 10D that belong to another group GCD, a radio repeater 20a, and a management apparatus 30.

The radio repeater 20a relays the radio communication between the radio terminals 10A and 10B that belong to the specific group GAB. Further, independently from the radio communication between the radio terminals 10A and 10B, the radio repeater 20a relays the radio communication between the radio terminals 10C and 10D that belong to another group GCD. The radio repeater 20a further includes besides the elements of the aforementioned radio repeater 20, a determination unit 25. The determination unit 25 determines whether the radio terminal 10A, and the radio terminal 10B, which is to receive the radio signal, belong to the specific group GAB when the reception unit 21 has received the radio signal from the radio terminal 10A. Then the relay equalizer 22 adjusts the frequency characteristic of the radio signal based on the configuration when it has been determined by the determination unit 25 that the radio terminal 10A, and the radio terminal 10B, which is to receive the radio signal, belong to the specific group GAB.

Further, the radio repeater 20a may include the configuration of the relay equalizer 22 for each group. Furthermore, different adjustment operations may be performed for each group, the configurations may be divided into groups depending on the user's language etc., and different adjusted results may be reflected for each group.

Other Embodiments

While the present disclosure has been described above in view of the aforementioned embodiments, the present disclosure is not limited to the configurations of the aforementioned embodiments. It is needless to say that the present disclosure includes various modifications, corrections, and combinations that one skilled in the art may perform within the scope of this disclosure set forth in claims of the present application.

Further, desired processing of the aforementioned communication apparatus can be achieved by causing a Central Processing Unit (CPU) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, the embodiments of the present disclosure include not only the case in which the functions of the aforementioned embodiments are achieved by the computer executing the program for achieving the functions of the aforementioned embodiments but also a case in which the functions of the aforementioned embodiments are achieved by the program collaborating with an operating system (OS) or an application software operated on the computer. Furthermore, a case in which the functions of the aforementioned embodiments are achieved by a function expansion board inserted into the computer or a function expansion unit connected to the computer that performs all or a part of the processing of this program is also included in the embodiments of the present disclosure.

According to the embodiments, it is possible to provide the radio repeater, the sound quality adjustment system, and the sound quality adjustment method for making the adjustment operation for the sound quality evaluation of the radio device easy, and performing communication in which the sound quality correction has been performed, the sound quality correction varying depending on the language or the like of the user.

While the disclosure has been described in terms of several embodiments, those skilled in the art will recognize that the disclosure can be practiced with various modifications within the spirit and scope of the appended claims and the disclosure is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

What is claimed is:

1. A radio repeater comprising:
a reception circuit configured to receive a radio signal from a first radio terminal;
a relay equalizer configured to adjust a frequency characteristic of the radio signal based on a configuration;
a control circuit configured to reflect configuration information on the frequency characteristic received via a communication line in a configuration of the relay equalizer; and
a transmission circuit configured to transmit the radio signal that has been adjusted to a second radio terminal,
wherein the control circuit determines whether the first radio terminal and the second radio terminal belong to a specific group when the radio signal is received, and
wherein the relay equalizer performs the adjustment when it has been determined that the first radio terminal and the second radio terminal belong to the specific group.

2. The radio repeater according to claim 1, wherein the transmission circuit transmits, in response to an instruction received via the communication line, the configuration information to the first radio terminal and the second radio terminal.

3. The radio repeater according to claim 1,
wherein the control circuit reflects the result of the adjustment in the relay equalizer when it has been determined that the first radio terminal and the second radio terminal belong to the specific group.

4. A sound quality adjustment system comprising:
first and second radio terminals;
a radio repeater that includes a relay equalizer configured to adjust a frequency characteristic of a radio signal based on a configuration and relays the radio signal between the first and second radio terminals; and
a management apparatus connected to the radio repeater via a communication line, wherein each of the first and second radio terminals sets off an equalizer of each of the first and second radio terminals, the management apparatus transmits a first configuration information on the frequency characteristic to the radio repeater via the communication line, the radio repeater reflects the first configuration information received from the management apparatus in the configuration of the relay equalizer, the first radio terminal transmits a first radio signal for the second radio terminal to the radio repeater, the radio repeater adjusts a frequency characteristic of the first radio signal that has been received based on the configuration in the relay equalizer, and the radio repeater transmits the first radio signal that has been adjusted to the second radio terminal.

5. The sound quality adjustment system according to claim 4, wherein the management apparatus accepts an evaluation in accordance with an output of the first radio signal in the second radio terminal, the management apparatus corrects the first configuration information in accordance with the evaluation and generates second configuration information, and the management apparatus transmits the second configuration information to the radio repeater via the communication line.

6. The sound quality adjustment system according to claim 5, wherein the second radio terminal accepts the evaluation in accordance with the output of the first radio signal from a user, the second radio terminal transmits the evaluation to the radio repeater as a second radio signal, and the radio repeater transmits the second radio signal that has been received to the management apparatus via the communication line.

7. The sound quality adjustment system according to claim 6, wherein the management apparatus transmits a third configuration information for a configuration of the equalizer to the radio repeater via the communication line, the radio repeater transfers the third configuration information received from the management apparatus to the first radio terminal and the second radio terminal, and each of the first radio terminal and the second radio terminal reflects the third configuration information received from the radio repeater in the configuration of the equalizer.

8. A sound quality adjustment method of a radio communication system, the sound quality adjustment method comprising:

setting off, in each of first and second radio terminals, a first equalizer in the first radio terminal and a second equalizer in the second radio terminal, the first and second radio terminals communicate via a radio repeater comprising a relay equalizer;

transmitting, in a management apparatus connected to the radio repeater via a communication line, first configuration information on a frequency characteristic of the relay equalizer to the radio repeater;

reflecting, in the radio repeater, the first configuration information in the relay repeater; and adjusting, in the relay equalizer, a frequency characteristic of a first radio signal based on the first configuration information reflected in the relay equalizer when the radio repeater relays the first radio signal which is transmitted to the second radio terminal by the first radio terminal via the radio repeater.

* * * * *